(12) United States Patent
Hernandez et al.

(10) Patent No.: US 8,165,119 B2
(45) Date of Patent: Apr. 24, 2012

(54) SYSTEM AND METHOD OF ENABLING A TRANSPARENT ETHERNET SWITCH

(75) Inventors: Hendrich M. Hernandez, Round Rock, TX (US); Robert L. Winter, Leander, TX (US); Bruce A. Holmes, Austin, TX (US); Michael J. Roberts, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 100 days.

(21) Appl. No.: 12/164,266

(22) Filed: Jun. 30, 2008

(65) Prior Publication Data
US 2009/0323553 A1  Dec. 31, 2009

(51) Int. Cl.
*H04L 12/56* (2006.01)
(52) U.S. Cl. ......................... 370/389; 370/392
(58) Field of Classification Search .................. 370/230, 370/250, 350, 389, 390, 391, 392, 393, 394, 370/400, 401, 423, 465, 466; 709/200, 243–249, 709/223–227, 230–233
See application file for complete search history.

(56) References Cited

U.S. PATENT DOCUMENTS

| | | | |
|---|---|---|---|
| 6,788,681 B1 * | 9/2004 | Hurren et al. | 370/389 |
| 6,944,159 B1 * | 9/2005 | Fotedar et al. | 370/392 |
| 6,954,810 B2 | 10/2005 | Delaney | |
| 7,593,400 B2 * | 9/2009 | Zelig et al. | 370/389 |
| 7,729,617 B2 * | 6/2010 | Sheth et al. | 398/135 |
| 7,839,869 B1 * | 11/2010 | Fotedar et al. | 370/401 |

OTHER PUBLICATIONS

Cisco, "Configuring VTP" Catalyst 3550 Multilayer Switch Software Configuration Guide, pp. 1-16. <http://www.cisco.com/en/US/docs/switches/lan/catalyst3550/software/release/12.1_19_ea1/configuration/guide/swvtp.html>.

\* cited by examiner

*Primary Examiner* — Robert Scheibel
*Assistant Examiner* — Mark A Mais
(74) *Attorney, Agent, or Firm* — Larson Newman, LLP

(57) ABSTRACT

A system and method of enabling a transparent Ethernet switch are disclosed. According to an aspect, a network switch is disclosed. The network switch can include a plurality of physical ports configured to communicate data via a network. The network switch can further include a memory configured to store a first forwarding database, and a plurality of aggregate zone entries within the first forwarding database. The aggregate zone entries can also include a port identifier of first port of the plurality of physical ports to be used as a transparent port within a first aggregate zone.

17 Claims, 4 Drawing Sheets

400

402 FDB: Total Size in bytes of FDB area
404 HASHSIZE: Hash table entry size per physical port
406 PORTS: Number of physical switch ports
408 TRANSPORTS: Number of physical switch ports in transparent port group
410 TRANSIZE: Size of independent FDB for this transaparent switch group
412 HASHSIZE = FDB / PORTS
414 TRANSIZE = TRANSPORTS * HASHSIZE

416

Ex: Let FDB = 1 Mbytes
   Let PORTS = 24
   Let TRANSPORTS = 4
   Then
       HASHSIZE = FDB / PORTS = 1,048,576 / 24 = 43,690 Bytes
       TRANSIZE = TRANSPORTS * HASHSIZE = 4*43,690 = 174,760 Bytes

*FIG. 4*

SYSTEM AND METHOD OF ENABLING A TRANSPARENT ETHERNET SWITCH

FIELD OF THE DISCLOSURE

This disclosure relates generally to information handling systems, and more particularly, to a system and method of enabling a transparent Ethernet switch.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 4 illustrates logic of a forwarding database allocation scheme according to another aspect of the disclosure.

The use of the same reference symbols in different drawings indicates similar or identical items.

DETAILED DESCRIPTION OF DRAWINGS

Figure 1:
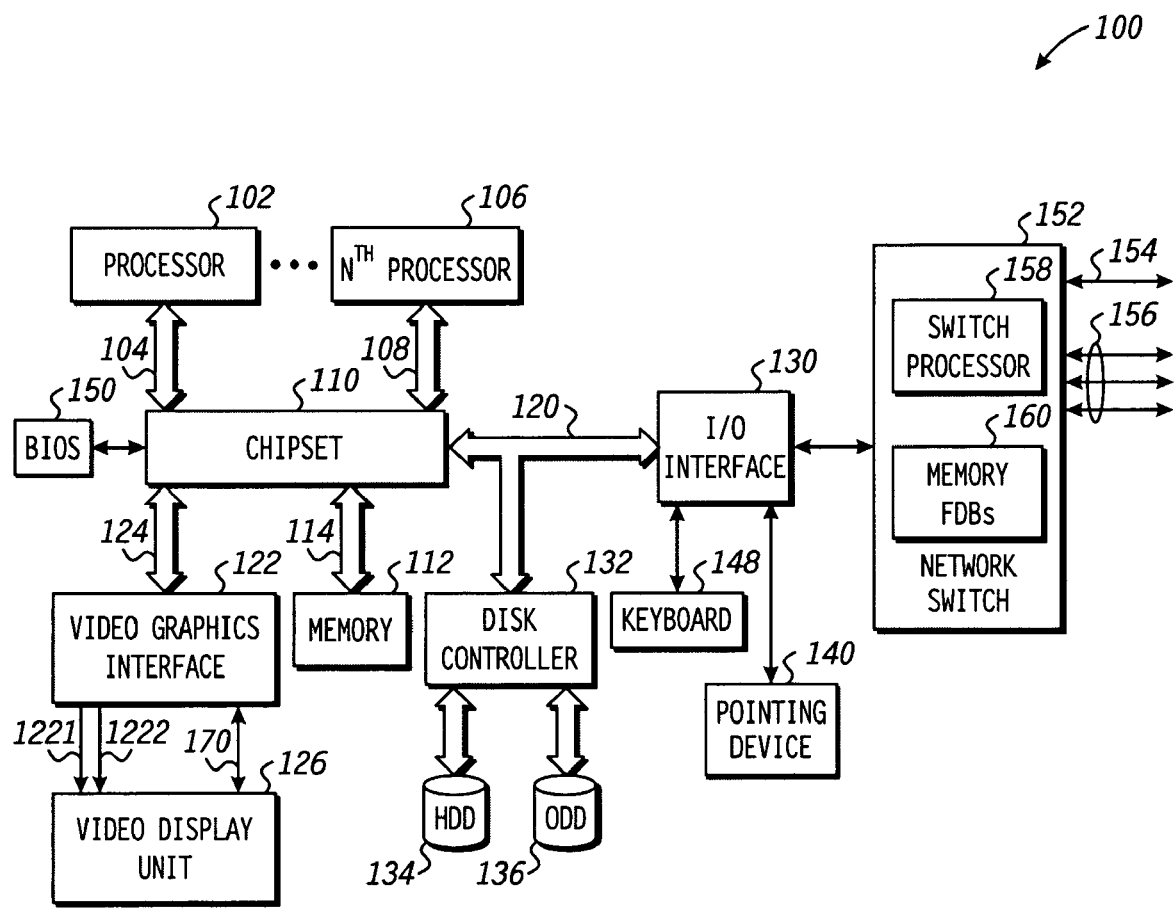
FIG. 1 illustrates a block diagram of an information handling system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect, a method of enabling network communication can include accessing a memory of a network switch configured to store a first forwarding database. The method can further include detecting the first forwarding database within the memory. The first forwarding database can include aggregate zone information. The method can also include detecting a first aggregate zone entry within the first forwarding database. The first aggregate zone entry can be configured to enable use of a first aggregate zone. The method can further include detecting a plurality of physical ports to be used within the first aggregate zone. The method can also include enabling use of the plurality of physical ports within the first aggregate zone using the aggregate zone information.

According to another aspect, a network switch is disclosed. The network switch can include a plurality of physical ports configured to communicate data via a network. The network switch can further include a memory configured to store a first forwarding database, and a plurality of aggregate zone entries within the first forwarding database. The aggregate zone entries can also include a port identifier of first port of the plurality of physical ports to be used as a transparent port within a first aggregate zone.

According to a further aspect, an information handling system is disclosed. The information handling system can include a memory configured to store a forwarding database including aggregate zone information. The information handling system can also include a plurality of physical ports configurable to be allocated to a first aggregate zone using a plurality of physical port entries stored within the memory. The information handling system can further include a processor configured to access the memory and detect the plurality of physical port entries. The plurality of physical port entries can be allocated to the first aggregate zone.

FIG. 1 illustrates a block diagram of an exemplary embodiment of an information handling system 100. The information handling system 100 can be a computer system such as a server, a desktop computer, a laptop computer, a rack of computers (e.g., networked servers), the like, or any combination thereof. After reading this specification, skilled artisans will appreciate that the information handling system can be configured to their particular needs or desires.

As illustrated in FIG. 1, the information handling system 100 can include a processor 102 connected to a host bus 104 and can further include additional processors generally designated as $N^{th}$ processor 106 connected to a host bus 108. The processors 102 and 106 can be separate physical processors, and in another embodiment, the processors 102 and 106 can be different cores within the same integrated circuit. The processor 102 can be connected to a chipset 110 via the host bus 104. Further, the processor 106 can be connected to the chipset 110 via the host bus 108. The chipset 110 can support multiple processors and can allow for simultaneous processing of multiple processors and support the exchange of information within information handling system 100 during multiple processing operations.

In an embodiment, the chipset 110 can be referred to as a memory hub or a memory controller. For example, the chipset 110 can include an Accelerated Hub Architecture (AHA) that uses a dedicated bus to transfer data between the processors 102 and 106. For example, the chipset 110 including an AHA-enabled chipset can include a memory controller hub and an input/output (I/O) controller hub. As a memory controller hub, the chipset 110 can function to provide access to the processor 102 using the host bus 104 and the processor 106 using the host bus 108. The chipset 110 can also provide a memory interface for accessing memory 112 using a host bus 114. In a particular embodiment, the host buses 104, 108, and 114 can be individual buses or part of the same bus. The chipset 110 can also provide bus control and handle transfers between the host buses 104, 108, and 114.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Accelerated Graphics Port (AGP) Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video/graphic interface module 122 that can be connected to the chipset 110 using host bus 124. The video/graphic module 122 includes two or more video/graphic ports, such as video/graphics port 1221 and video/graphic port 1222, capable of providing image information substantially simultaneously to a common video/graphics display device 126 for substantially simultaneous display as described in greater detail herein. Also, each of the video/graphic ports 1221 and 1222 are capable of providing image information to separate video/graphic devices for substantially simultaneous display. The video/graphic display device 126 is also referred to herein as a display unit 126.

The display unit 126 can include one or more types of video/graphic display devices, such as a flat panel display (FPD) or other type of display device. In accordance with the present disclosure, the video/graphic interface module 122 can detect the presence of a cable adapter 170 and configure multiple video/graphic ports, such as DisplayPort video/graphic ports, to operate in tandem along with the cable adapter to implement a Dual-Link DVI video/graphic port.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. In one form, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134 and an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive. The information handling system 100 can also include a basic input output system (BIOS) 150.

According to a further aspect, the information handing system can include a network switch 152 configured to be coupled to an I/O port of the information handing system 100. For example, the I/O power can be configured with network communication device (e.g. LAN card, WAN card, 802.11g card, etc.). The network switch 152 can include an Ethernet switch, or various other network switches configured to communicate network traffic. The network switch 152 can also include a physical port 154 and aggregate physical ports 156. In a particular form, the aggregate physical ports 156 can include any number of ports and can also be configured as transparent communication ports. As such, the network switch 120 can be realized as a transparent Ethernet switch. The network switch 152 can also include a switch processor 158 configured to enable switching of network traffic within the network switch 152. Additionally, the network switch 152 can also include a memory 160 configured to store information communicated as network traffic.

In a particular form, the memory can include one or more forwarding data bases (FDBs) that can be used to associate physical ports with network traffic within the aggregated physical ports 156. For example, the FDBs can include an entry of a physical port within the aggregated physical ports 156, and can associate or enable specific network traffic to be communicated using a specified physical port within the aggregated physical ports 156. Additionally, physical ports not allocated within the aggregated physical ports 156 can be used to communicate network traffic other than the specified network traffic. In this manner, an aggregated physical port configuration can be used to communicate dedicated and non-dedicated network traffic as desired.

Figure 2:
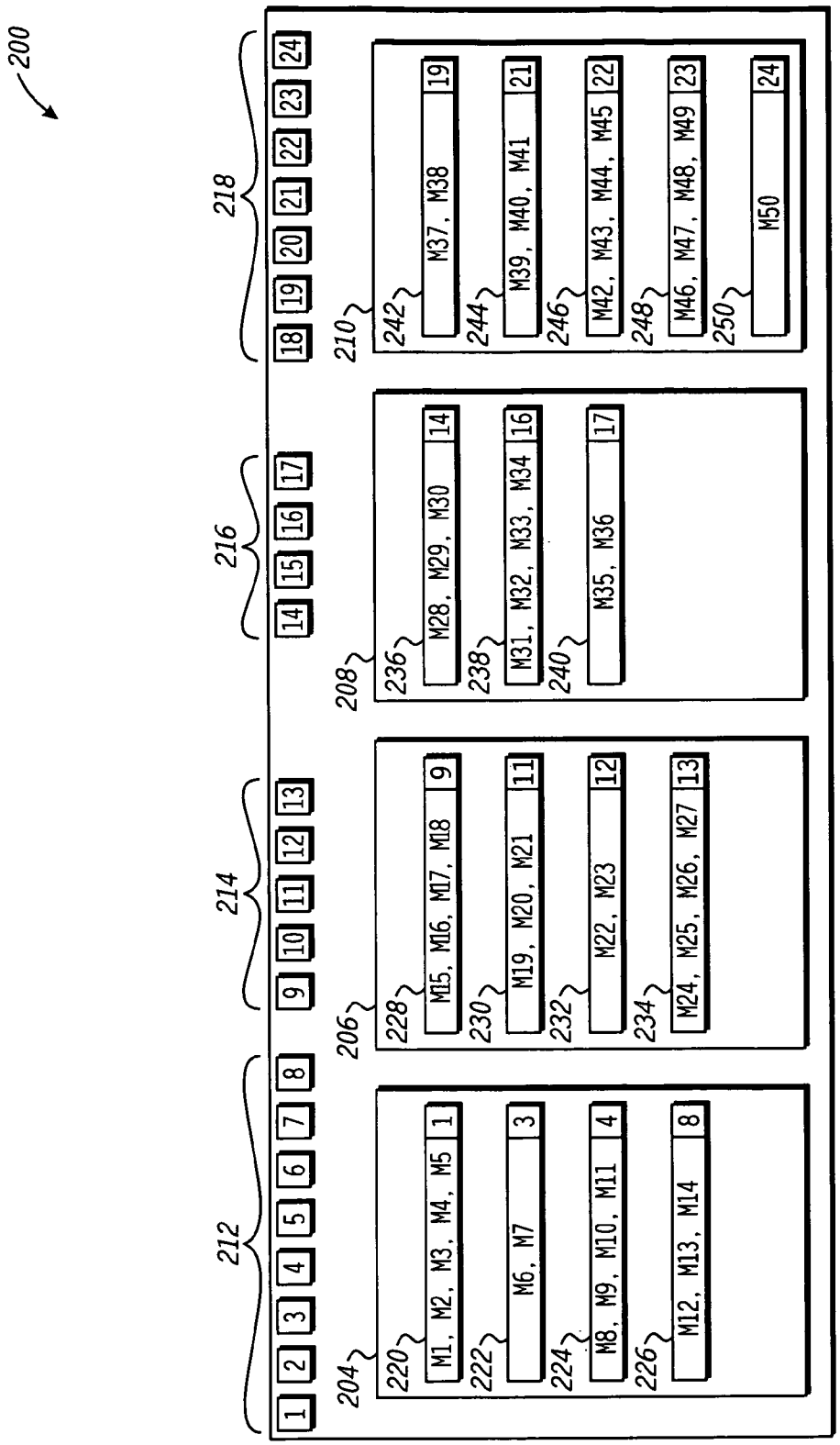
FIG. 2 illustrates a functional block diagram of an aggregated switch employing plural forwarding databases according to an aspect of the disclosure.

FIG. 2 illustrates a functional block diagram of a network switch, illustrated generally at 200, employing plural FDBs according to an aspect of the disclosure. The network switch 200 can include a FDB 204, FDB 206, FDB 208, and FDB 210. The network switch 200 can also include an aggregate zone 212 including physical ports 1 to 8, an aggregate zone 214 including physical ports 9 to 13, an aggregate zone 216 including physical ports 14 to 17, and an aggregate zone 218 including physical ports 18 to 24. Although illustrated as having twenty-four ports, an increased or decreased number of physical ports can be used. Additionally, each aggregate zone is not limited to the number of, or specific physical ports. As such, various combinations of physical ports and aggregate zones can be used as needed or desired. FDBs 204, 206, 208, 210 can also be combined, in whole or in part, into a single database, multiple databases, a single memory device, multiple memory devices, or any combination thereof.

According to a further aspect, the FDB 204 can include entries to identify traffic that can be communicated within an aggregate zone 212. For example, the FDB 204 can include a port one entry 220 identifying network traffic having a specific machine access code (MAC) addresses that can be communicated using port one. For example, network traffic having an address of M1, M2, M3, M4, and M5 can be communicated using port one. Similarly, network traffic having an address of M5 and M6 can be communicated using port three. Network traffic having an address of M8, M9, M10, and M11 can be communicated using port four. Network traffic having an address of M12, M13, and M14 can be communicated using port eight. In this manner, a specific port within the aggregate zone 212 can be dedicated to specific traffic having specified MACs. Additionally, physical ports within aggregate zone 212 that are not listed within the FDB 204 (e.g. port 2, port 5, port 6, and port 7) can be used to communicate network traffic having MAC addresses not listed within the FDB 204.

In a similar manner, the network switch 200 can include ports nine to thirteen within aggregate 214. The FDB 206 can include multiple entries allocated network traffic to be communicated using a specific port. For example, the FDB 206 can include an entry 228 identifying network traffic to be communicated using port nine, an entry 230 identifying network traffic to be communicated using port eleven, an entry 232 identifying network traffic to be communicated using port twelve, and an entry 234 identifying network traffic to be communicated using port thirteen. Similarly, the FDB 208 includes entries 236, 238, 240 identifying ports and MACs to be communicated within the aggregate zone 216. The FDB 210 includes entries 242, 244, 246, 248, 250 identifying ports and MACs to be communicated within the aggregate zone 218.

Figure 3:
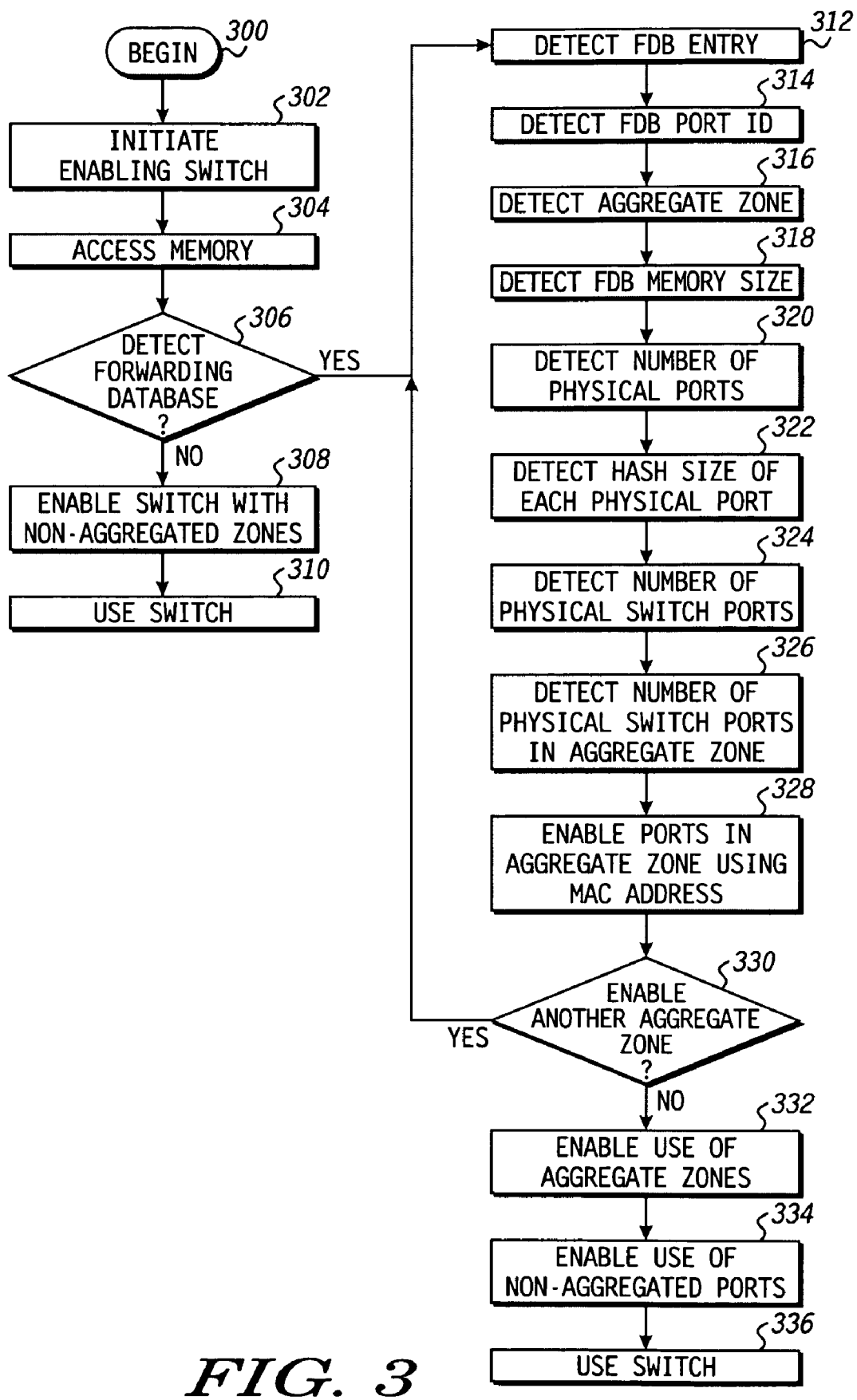
FIG. 3 illustrates a flow diagram describing a method of enabling a forwarding database using aggregated switch ports according to another aspect of the disclosure.

FIG. 3 illustrates a flow diagram describing a method of enabling a forwarding database using aggregated switch ports according to another aspect of the disclosure. FIG. 3 can be employed in whole, or in part, by the information handling system 100 depicted in FIG. 1, the switch 200 of FIG. 2, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions of, the method of FIG. 3.

The method begins generally at block 300. At block 302, the method initiates enabling a switch. For example, a switch such as switch 200 or another type of switch can be enabled. The method can further proceed to block 304 and accesses a memory of the switch to detect whether a forwarding database (FDB) is stored within memory of the switch. The method can then proceed to decision block 306, and if a FDB may not be detected, the method can proceed to block 308 can enables with switch using non-aggregated zones. The method can then proceed to block 310 and the switch can be used.

If at decision block 306, a FDB can be detected, the method can proceed to block 312 and detects an FDB entry within the FDB. The method can then proceed to block 314 and detects a port ID within the FDB. The method can further proceed to block 316 and detects an aggregate zone to be used. The method can further proceed to block 318 and detects a FDB memory size of the memory area used by the FDB. The method can then proceed to block 320, and detects the number of physical ports of the switch. The method can then proceed to block 322 and can detect a hash size of each physical port. For example, a hash size can include a value of thirty-two kilobytes (e.g. 32 KB, or 32×1024 bytes), forty-three kilobytes, or various other sizes as needed or desired. The method can then proceed to block 324 and detects a number of switch ports of the specific aggregate zone. Upon detecting the number of physical switch ports in an aggregate zone, the method can proceed to block 328 and enables ports in the specific aggregate zone using one or more MAC addresses stored within the FDB to be associated with the aggregate zone and specified ports.

Upon enabling one or more ports within an aggregate zone, the method can proceed to decision block 330, and detects whether to enable another aggregate zone. If another aggregate zone should be enabled, the method can proceed to block 312 and repeats. If at decision block 330, another aggregate zone should not be enabled, the method can proceed to block 332, and use of each aggregate zone can be enabled. The method can then proceed to block 314 and use of non-aggregated ports can be enabled. For example, one or more ports may not be grouped within an aggregate zone. As such, the non-grouped ports can be used as non-aggregated ports. However, in some embodiments, there may not be non-grouped ports available. Upon enabling use of non-aggregated ports if desired, the method can proceed to block 336 and the switch can be used.

FIG. 4 illustrates logic of a forwarding database allocation scheme according to another aspect of the disclosure. FIG. 4 can be employed in whole, or in part, by the information handling system 100 depicted in FIG. 1, the BIOS test system 200 of FIG. 2, or any other type of system, controller, device, module, processor, or any combination thereof, operable to employ all, or portions of, the logic of FIG. 4. Additionally, the logic can be embodied in various types of encoded logic including software, firmware, hardware, or other forms of digital storage mediums, computer readable mediums, or logic, or any combination thereof, operable to provide all, or portions of, the logic of FIG. 4.

The encoded logic, illustrated generally at 400, can include a forward data base entry (FDB) 402 configured to include a total size (e.g. bytes) of a forwarding database memory area. The encoded logic can further include a hash size entry 404 configured to identify a hash table entry size per physical port within a switch such as an exemplary switch 200 described in FIG. 2 above. The encoded logic can further include a ports entry 406 that can be configured to include the number of physical switch ports of a switch. The encoded logic 400 can also include a transports entry 408 that can be configured to include the number of physical switch ports in a transparent group. The encoded logic 400 can also include a transize entry 410 configured to include the size of independent forwarding databases used in association with a transparent switch group. The encoded logic 400 can also include a hash size entry 412 that can be determined by dividing the FDB entry 404 by the ports entry 406. The encoded logic 400 can also include determining the transize entry 414 by multiplying the transports entry 408 by the hash size entry 412.

The encoded logic 400 can be used within a sequence of logic steps illustrated by a logic sequence 416. For example, the logic sequence 416 can include defining the FDB=1 Megabytes, the PORTS=24, and the transports=4. The hash size can then be determined by dividing FDB value by the ports value. Additionally, the transize can be determined by multiplying the transports value by the hash size value.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of enabling network communication comprising:
   detecting a first plurality of physical ports within a network switch;
   accessing a memory, of the network switch, configured to store a first forwarding database;
   detecting the first forwarding database within the memory, wherein the first forwarding database includes aggregate zone information;
   detecting a first aggregate zone entry within the first forwarding database, wherein the first aggregate zone entry is configured to enable use of a first aggregate zone;
   detecting a second plurality of physical ports within the first plurality of physical ports to be used within the first aggregate zone;
   enabling use of the second plurality of physical ports within the first aggregate zone using the aggregate zone information; and
   dedicating the second plurality of physical ports within the first aggregate zone of the network switch to receive or transmit specific network traffic addressed only to a specified MAC address;
   detecting a non-aggregate physical port within the first plurality of physical ports of the network switch; and
   enabling use of the non-aggregate physical port along with the second physical ports of the first aggregate zone, wherein the non-aggregate physical port is used to receive or transmit network traffic addressed to any MAC address.

2. The method of claim 1, further comprising:
   determining a first portion of the first plurality of physical ports to be used as a transparent port;
   determining a second portion of the first plurality of physical ports to be used as a non-transparent port; and
   enabling use of the first portion and second portion of the first plurality of physical ports within the first aggregate zone.

3. The method of claim 1, further comprising:
   detecting a second forwarding database within the memory, wherein the second forwarding database includes a second aggregate zone entry configured to enable use of a second aggregate zone;
   identifying a first port from the first plurality of physical ports to be used within the second aggregate zone; and
   enabling use of the first port within the second aggregate zone.

4. The method of claim 1, further comprising:
   detecting a port identifier of a first physical port;
   determining whether to associate the port identifier with the first aggregate zone;
   enabling use of the first physical port within the first aggregate zone in response to associating the port identifier with the first aggregate zone; and
   enabling network traffic of a first MAC address at the first physical port.

5. The method of claim 1, further comprising:
   detecting a memory size of the first forwarding database;
   detecting a number of physical ports within the second plurality of physical ports; and
   detecting a hash size of each of the second plurality of physical ports.

6. The method of claim 1, further comprising:
   detecting a number of physical switch ports in the first aggregate zone;
   enabling the number of physical switch ports using a first MAC address; and
   enabling use of the first aggregate zone.

7. The method of claim 1, further comprising:
   detecting a second aggregate zone to enable;
   accessing second forwarding database used to enable the second aggregate zone; and
   enabling the second aggregate zone using the second forwarding database.

8. The method of claim 1, further comprising:
   detecting non-transparent physical ports within the first plurality of physical ports; and
   enabling a second aggregate zone including non-transparent physical ports.

9. The method of claim 1, further comprising:
   detecting a number of physical ports;
   detecting a number of transparent ports within the first aggregate zone; and
   enabling a forward database transport size of the first forward database using the number of transparent ports and a hash table entry size of each physical port.

10. A network switch comprising:
    a first plurality of physical ports configured to communicate data via a network;
    a memory configured to store a first forwarding database;
    a plurality of aggregate zone entries within the first forwarding database, wherein the aggregate zone entries includes a port identifier of a port of the first plurality of physical ports to be used as transparent ports within a first aggregate zone; and
    a plurality of non-aggregate ports within the first plurality of physical ports that are non- grouped physical ports based on the aggregate zone entries;
    wherein the first aggregate zone includes a second plurality of physical ports within the first plurality of ports, wherein the second plurality of physical ports includes transparent access ports and non-transparent access ports; and wherein the transparent access ports are restricted to communicate only information transmitted to or received from specific MAC addresses, and the non-transparent access ports are configured to communicate information other than information transmitted to or received from the specific MAC addresses.

11. The network switch of claim 10, further comprising:

a plurality of transparent ports configured to be used within the first aggregate zone; and a forwarding database transport size of the first forward database, wherein the forwarding database transport size is configured to be detected based on the number of transparent ports and a hash table entry size of a physical port within the plurality of physical ports.

12. The network switch of claim 10, further comprising:

a second forwarding database stored within the memory and configured to enable a second aggregate zone; and wherein the second aggregate zone includes physical ports not identified within the first forwarding database.

13. The network switch of claim 10, further comprising:

a second aggregate zone including a second plurality of physical ports, wherein the second plurality of physical ports include the non-transparent access ports.

14. The network switch of claim 10, further comprising a processor configured to:

detect a forwarding database memory size;

detect a number of physical ports; and detect a number of transparent ports within the first aggregate zone.

15. The network switch of claim 14, wherein the processor is further configured to:

determine a hash size using the forwarding database memory size and the number of physical ports;

determine a transport size using the number of transparent ports and hash size table entry of the forwarding database; and enable the first aggregate zone using the hash size and the transport size.

16. An information handling system comprising:

a memory configured to store a forwarding database including aggregate zone information;

a plurality of physical ports configurable to be allocated to a first aggregate zone using a plurality of physical port entries stored within the memory;

a processor configured to access the memory and detect the plurality of physical port entries, wherein the plurality of physical port entries are allocated to the first aggregate zone;

a first subset of the plurality of physical ports configured to be used within a first aggregate zone, and the first subset of the plurality of physical ports configured to be dedicated only to network traffic transmitted to one specific MAC address; and a second subset of the plurality of physical ports configured to be used within the first aggregate zone, wherein the second subset is not limited to the network traffic transmitted to the one specific MAC address.

17. The information handling system of claim 16, wherein the processor is configured to:

detect a memory size of the forwarding database;

detect a number of the plurality of physical ports;

detect a number of transparent ports within the first aggregate zone;

determine a hash size using the forwarding database memory size and the number of ports;

determine a transport size using the number of transparent ports and the hash size; and enable the first aggregate zone using the hash size and the transport size.

* * * * *